US012603604B2

(12) United States Patent
Neal et al.

(10) Patent No.: US 12,603,604 B2
(45) Date of Patent: Apr. 14, 2026

(54) SOLAR MODULE MOUNT

(71) Applicant: Unirac Inc., Albuquerque, NM (US)

(72) Inventors: Jonathan Neal, Albuquerque, NM (US); Deepthi Gangumalla, Hyderabad (IN); Nikhil Babu P, Hyderabad (IN)

(73) Assignee: Unirac, Inc., Albuquerque, NM (US)

( * ) Notice: Subject to any disclaimer, the term of this patent is extended or adjusted under 35 U.S.C. 154(b) by 24 days.

(21) Appl. No.: 18/369,624

(22) Filed: Sep. 18, 2023

(65) Prior Publication Data

US 2024/0097609 A1     Mar. 21, 2024

Related U.S. Application Data

(60) Provisional application No. 63/407,543, filed on Sep. 16, 2022.

(51) Int. Cl.
H02S 30/10          (2014.01)
F16B 2/06          (2006.01)
(52) U.S. Cl.
CPC .............. H02S 30/10 (2014.12); F16B 2/06 (2013.01)
(58) Field of Classification Search
None
See application file for complete search history.

(56) References Cited

U.S. PATENT DOCUMENTS

| | | | |
|---|---|---|---|
| 8,801,349 B2 | 8/2014 | Mcpheeters | |
| 9,160,273 B2 | 10/2015 | Schuit | |
| 10,240,820 B2 | 3/2019 | Ash | |
| 11,143,436 B1 * | 10/2021 | Stephan | ................ F24S 25/632 |
| 2011/0283492 A1 * | 11/2011 | McPheeters | ............ F24S 25/00 24/569 |
| 2019/0178274 A1 * | 6/2019 | Katz | ........................ F16B 7/187 |

OTHER PUBLICATIONS

The PCT Search Report and Written Opinion mailed Jan. 5, 2024 for PCT Application No. PCT/US/33071 from PCT Summary, 28 pages.

* cited by examiner

*Primary Examiner* — Dustin Q Dam
(74) *Attorney, Agent, or Firm* — Lee & Hayes, P.C.

(57)          ABSTRACT
A clamping mechanism includes a body defining a first end, a second end, a module engagement component disposed proximate to the first end, and a clamp actuation component disposed proximate to the second end. The module engagement component engages a portion of a solar module frame. The clamping mechanism includes a rail engagement component that engages at least a portion of a rail to which the solar module frame couples. The clamping mechanism includes a fastener that engages the clamp actuation component for imparting movement to the module engagement component such that the module engagement component engages the portion of the solar module frame.

20 Claims, 23 Drawing Sheets

100

116    112    114

146(1)    122

102

140    144    134

132    104

126    130

118    120

136

124

110

200

220

116

100

216          202

208          204

218

206

200

216

218

212

120

118

130

214

202

208

210

A ◄- - - - - - - -

200

146(2)

146(1)

116

220

218

216

202

118

208

214

212

A ◄- - - - - - - -

200

234

100

THIRD
DIRECTION
226

202

218

116          220

230

FOURTH
DIRECTION
228

208

232

FIRST
DIRECTION
222

130

118          120

SECOND
DIRECTION
224

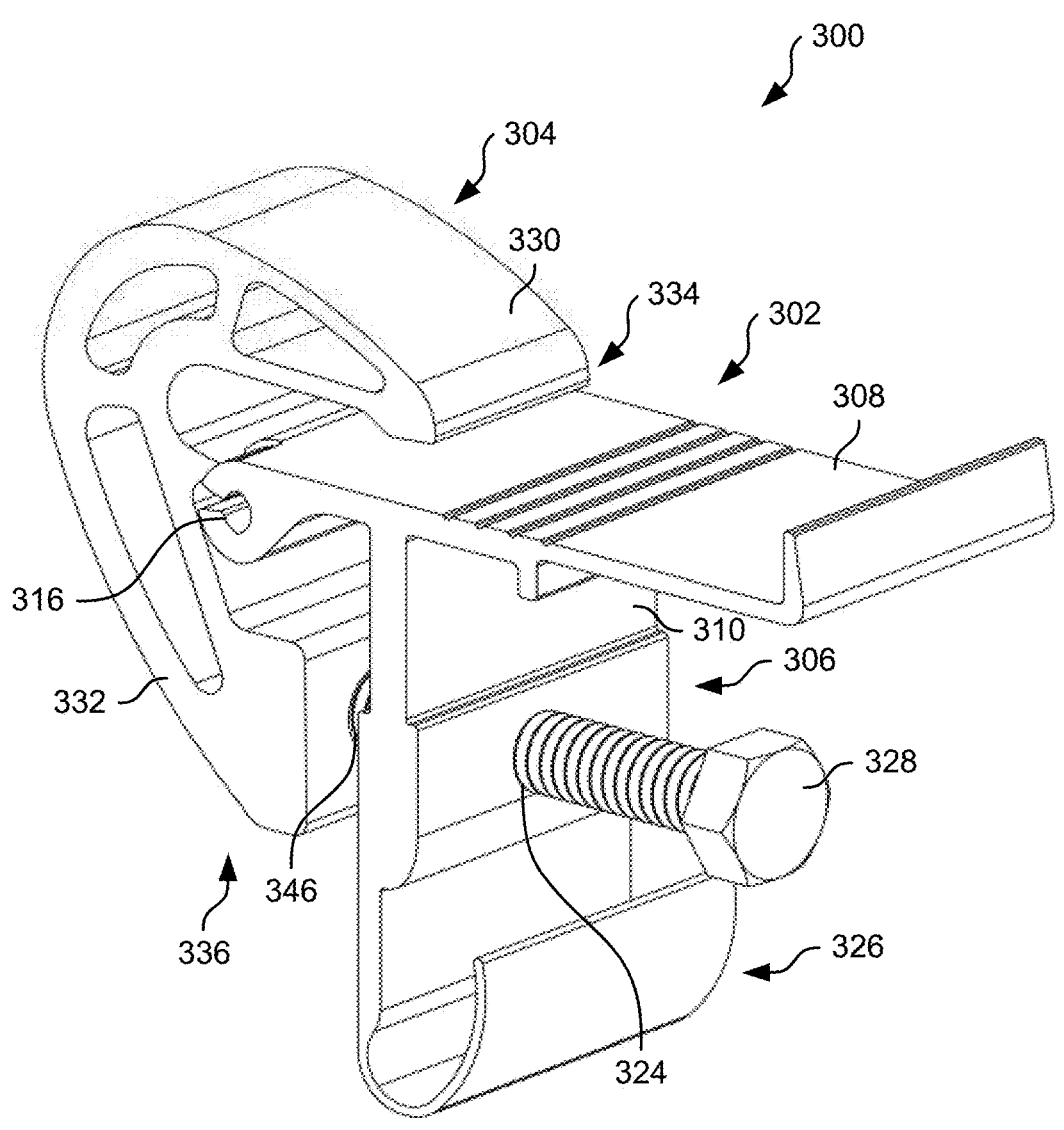
FIG. 3A
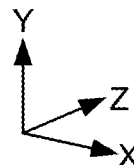

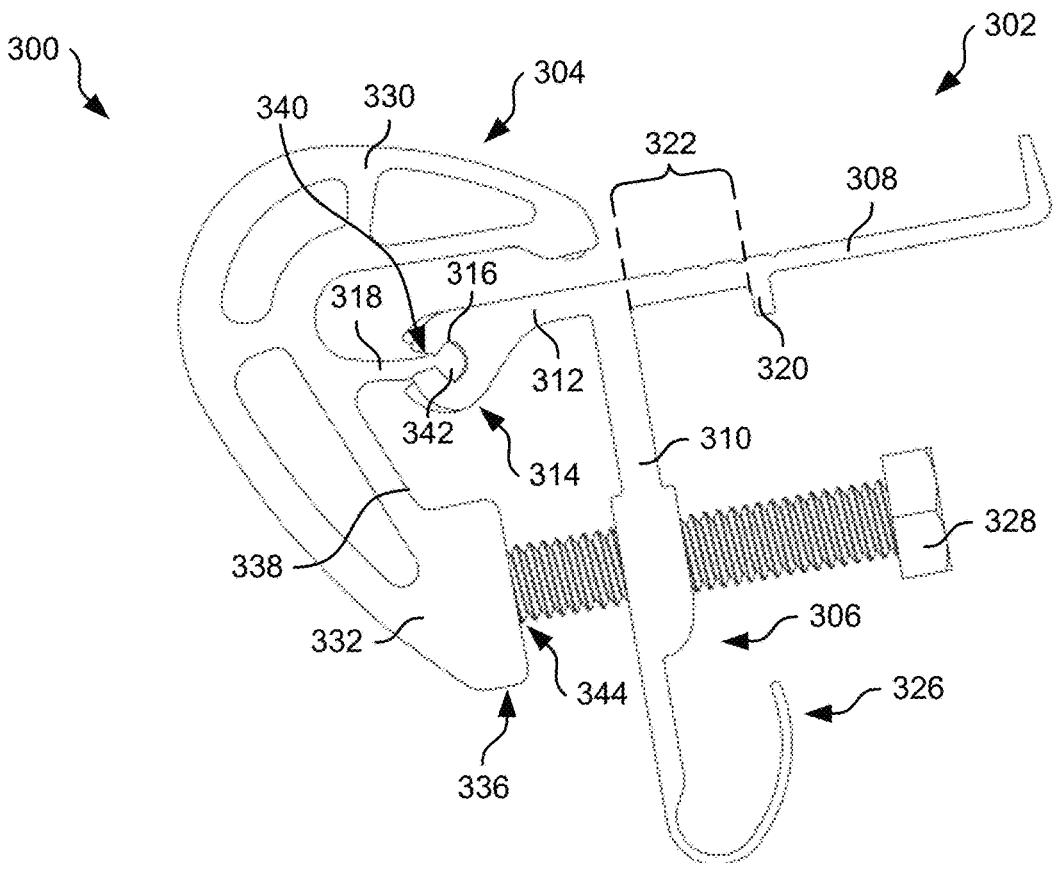
FIG. 3B
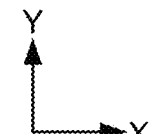

300
304
330    514
312
334
302
308
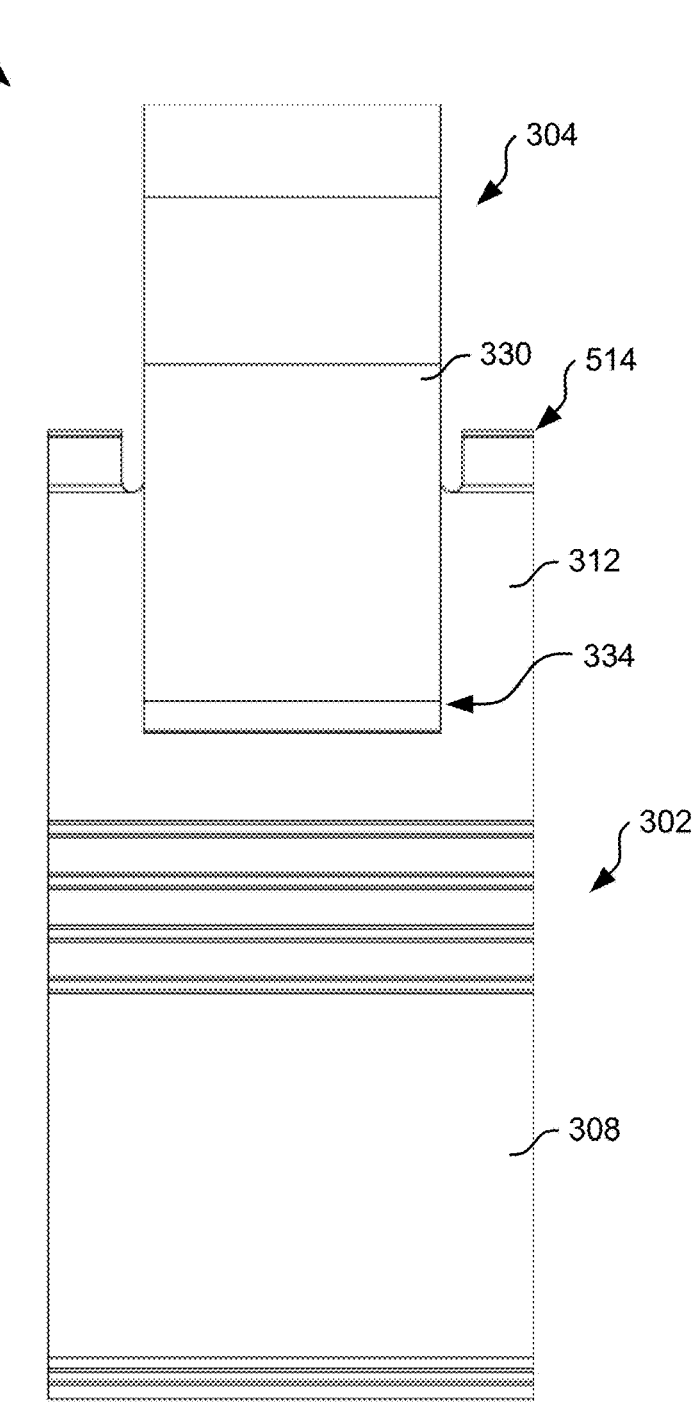
FIG. 3C
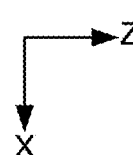

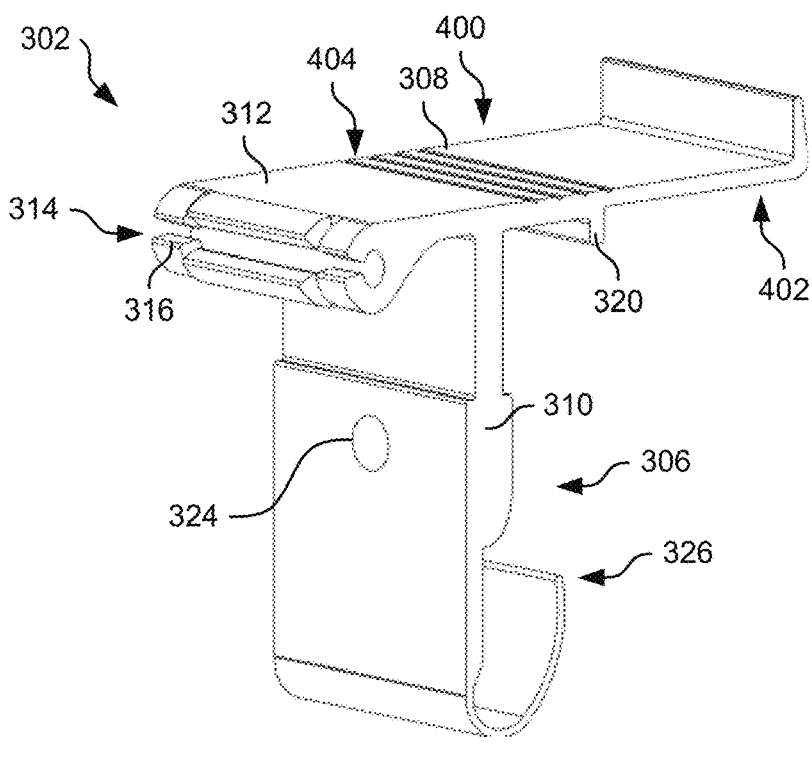
FIG. 4
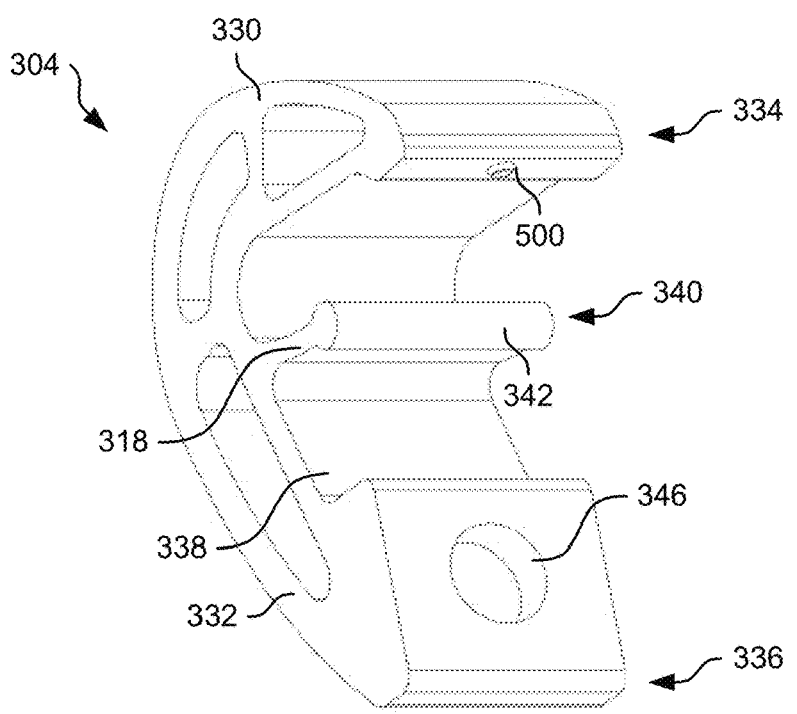
FIG. 5
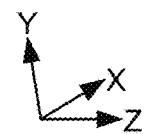

600

330

300

332

606

602

600

300

308

606

602

332

328

310

326

604

600

THIRD
DIRECTION
612

330   606

614

308   400

402

318

320

312
310

604   328

306

FIRST
DIRECTION
608

332

346
344

326

300

602

SECOND
DIRECTION
610

Y

X

700

702

704

706

722

718

710

714

724

708

716

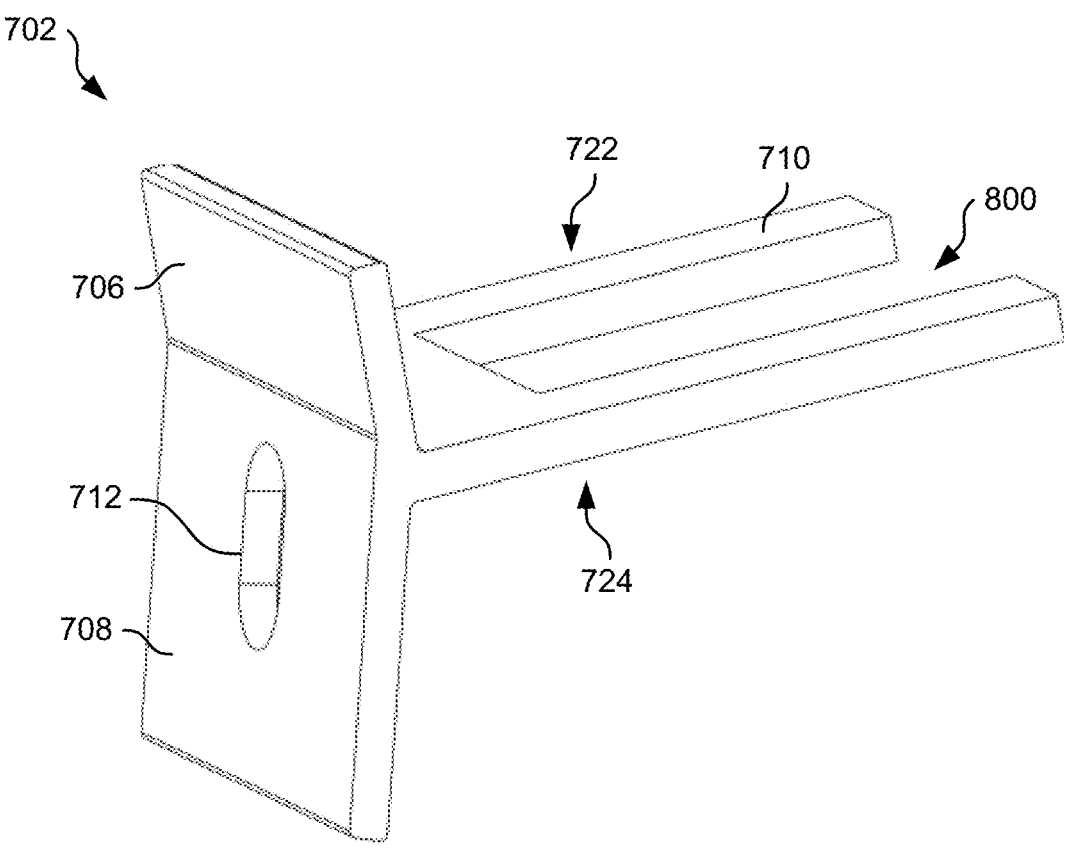
702
722    710    800
706
712
708
724
FIG. 8
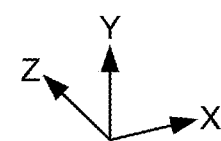

704

910

918

916  912

920

718

914

908

904

906

716

Y
X

704

902

910

718

918

914

904

720

716

900

Y
Z   X

SOLAR MODULE MOUNT

CROSS-REFERENCE TO RELATED APPLICATIONS

This application claims priority to U.S. Provisional Patent Application No. 63/407,543, filed on Sep. 16, 2022, the entirety of which is incorporated by reference.

BACKGROUND

Solar energy is a rapidly growing technology worldwide and offers the potential of almost unlimited clean and sustainable energy. However, the use of solar electric technology has been limited by costs associated with installing solar modules to new and existing structures. As a result, it is desirable to reduce installation costs by simplifying the installation and the manufacturing of the components, as well as by reducing the number of components.

When installing a solar module on a rail, various clamps may be utilized due to the varying sizes of the modules and various rail configurations. While some clamps may be used to secure different types of solar modules to different types of rails, this remains an area of concern. Similarly, solar modules may be installed on a number of different kinds of rails and/or brackets, each of which may provide a benefit for a specific use or purpose. Additionally, solar modules are often installed on a roof or other surface for exposure to sunlight. Thus, once installed, the solar modules are generally visible despite some desire to have them concealed. Therefore, aesthetics and function are often concerning as well.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

FIGS. 3A-3C illustrate an example clamping mechanism configured to secure a solar module to a mounting rail, according to an embodiment of the present disclosure.

FIG. 4 illustrates a first body, or portion, of the clamping mechanism of FIGS. 3A-3C, according to an embodiment of the present disclosure.

FIG. 5 illustrates a second body, or portion, of the clamping mechanism of FIGS. 3A-3C, according to an embodiment of the present disclosure.

FIG. 8 illustrates a first body, or portion, of the clamping mechanism of FIGS. 7A-7C, according to an embodiment of the present disclosure.

DETAILED DESCRIPTION

Figure 1A:
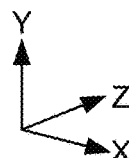
FIGS. 1A-1D illustrate an example clamping mechanism configured to secure a solar module to a mounting rail, according to an embodiment of the present disclosure.
Figure 1B:
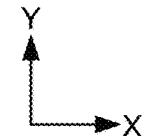
Figures 1C, 1D:
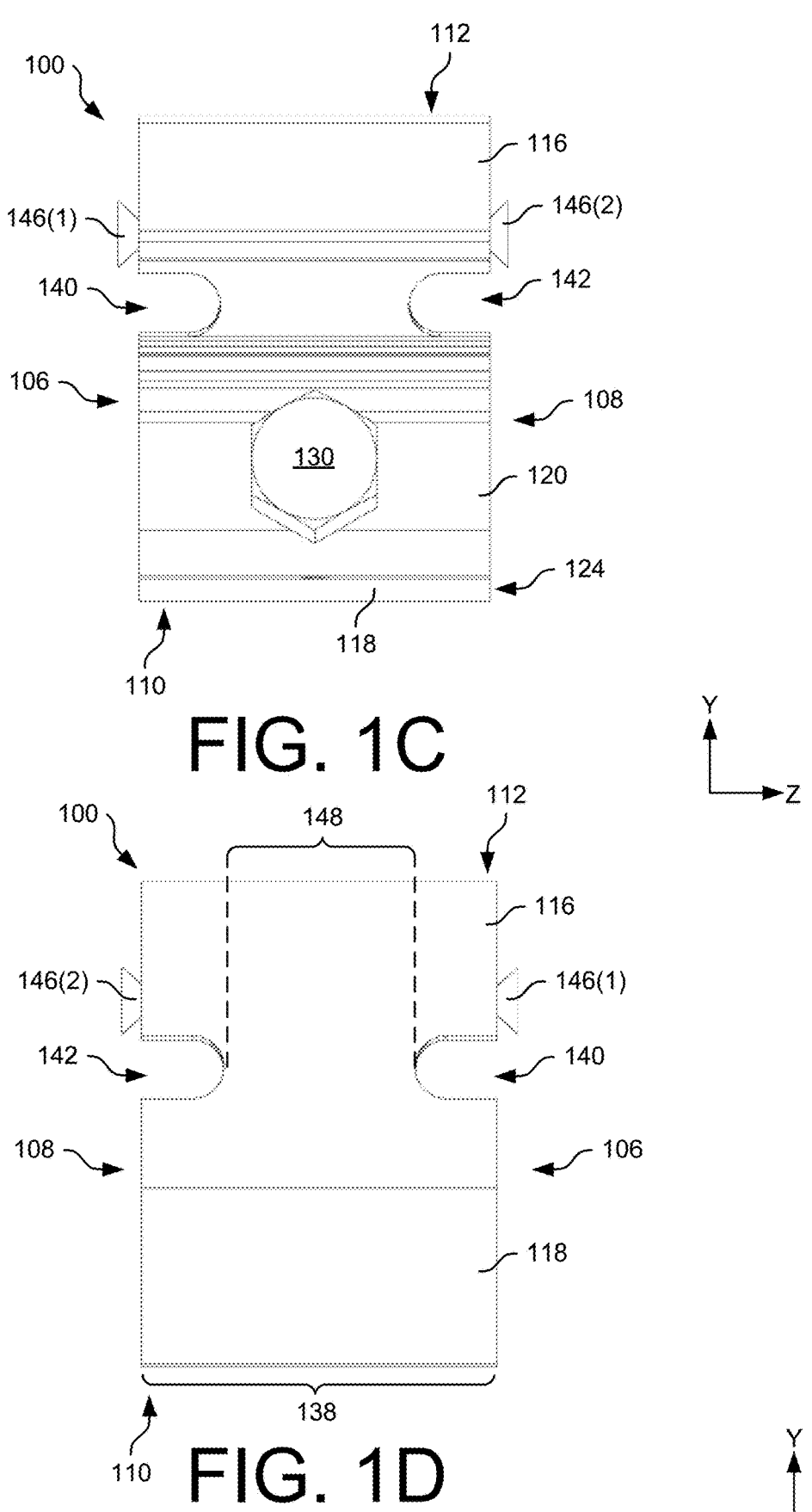

This application is directed, at least in part, to a clamping mechanism configured to couple (e.g., secure, affix, mount, etc.) a solar module to a mounting rail. In an embodiment, the mounting rail may be installed on a surface, such as a roof, and the clamping mechanism may couple the solar module to the mounting rail for securing the solar module to the surface. In an embodiment, the clamping mechanism may be at least partially disposed within, or secured along, the mounting rail. For example, the mounting rail may include a channel in which the clamping mechanism is at least partially received or disposed. A fastener, for example, may be actuated in order to couple the solar module to the mounting rail. For example, tightening (e.g., rotating) the actuator may cause components of the clamping mechanism to at least partially maneuver (e.g., pivot, rotate, translate, etc.) in order to clamp the solar module to the mounting rail. In an embodiment, when installed, the clamping mechanism may be hidden from direct visibility for increasing aesthetics of the clamping mechanism, the solar module, the mounting rail, and/or other components used to secure the solar module to the surface.

In an embodiment, the mounting rail may include an elongated structural member. The mounting rail may include the channel, for example, disposed along a length of the mounting rail. A top of the mounting rail may be open to the channel. In an embodiment, the top of the mounting rail may include inwardly turned shoulders or flanges. For example, a first side of the top of the mounting rail may include a first flange and a second side, opposite the first side, may include a second flange. The first flange and the second flange may support, or receive, a portion of the clamping mechanism to allow for the coupling of the solar module to the mounting rail.

Additionally, the mounting rail may be secured to the surface via fasteners, brackets, mounts, and the like. In an embodiment, the mounting rail may have a generally "U-shaped" configuration (e.g., cross-sectional shape). However, other shapes of the channel are envisioned, such as a "C-shaped" configuration. The mounting rail may also take various shapes, such as being straight (e.g., linear), curved, and/or any combination thereof. In an embodiment, attachment mechanisms other than the mounting rail may be coupled to the surface, and in such instances, the clamping mechanism may engage with the attachment mechanisms in addition to or alternative from the mounting rail in order to couple the solar module to the surface. Furthermore, although described herein as a "mounting rail," the clamping mechanism may be configured to be disposed in, couple to, or otherwise connect the solar module to other struts, mounting frames, mounting brackets, and the like.

In an embodiment, the solar module may include a solar module frame that at least partially encases, receives, or houses the solar module. In an embodiment, the clamping mechanism engages with the solar module itself, or the solar module frame, for coupling the solar module to the mounting rail. For example, the clamping mechanism may clamp to the solar module frame in order to couple the solar module to the surface. Although described herein as a "solar module," other terms for the solar module may include a photovoltaic (PV) module, PV panel, PV cell, etc., and such terms may be used interchangeably. Further, individual solar modules may include a single PV panel that represents an assembly of connected solar cells, or multiple PV panels that include any number of solar cells.

In an embodiment, the clamping mechanism may include a body that defines a module engagement component, a rail engagement component, and/or a clamp actuation component. The module engagement component, the rail engagement component, and/or the clamp actuation component may represent different portions, sections, etc. of the clamping mechanism. For example, as used herein, the use of the term "component" may be substituted with other terms such as portion, part, feature, member, segment arm, etc., any one of which may indicate a separate and distinct, but interconnected or interconnectable element, and/or may indicate merely a continuous aspect of a monolithic, integral, unitary body.

In an embodiment, the body may include a first end and a second end. The first end may be disposed at an end of the module engagement component and represent a portion of the body that engages with the solar module frame, external to the channel. The second end may be disposed at an end of the clamp actuation component, internal to the channel. As will be discussed herein, an end of the fastener may engage against an interior surface of the clamp actuation component proximate to the second end. In an embodiment, at least a portion of the body may be configured, sized, and/or shaped to slide into the channel of the mounting rail such that the module engagement component may be positioned external the mounting rail and the clamp actuation component may be positioned within the mounting rail. In an embodiment, the body may be generally "U shaped," or similarly, "C shaped." Regardless of the specific shape, however, in an embodiment, the shape of the body may be defined by the module engagement component and the clamp actuation component. For example, a point of connection between the module engagement component and the clamp actuation component may be integral and continuous. In an embodiment, the module engagement component may extend outward from a vertex (i.e., a point of integration or union) with the clamp actuation component, where the clamp actuation component extends outward in a corresponding direction from the vertex, thus defining the "U-shape" or the "C-shape."

In an embodiment, the rail engagement component may extend from the interior surface of the clamp actuation component, at a location between the first end and the second end of the body. The rail engagement component may flexibly extend from the clamp actuation component and may be configured, sized, and/or shaped to engage the first flange and the second flange of the mounting rail. In an embodiment, the rail engagement component may be coupled to the clamp actuation component via a compliant flexion web. Moreover, an end of the rail engagement component that is configured to engage with the first flange and the second flange of the mounting rail may have a width that is substantially similar to an interior width (e.g., cross-sectional dimension) of the mounting rail. In doing so, the rail engagement component may be disposed within the channel and the end of the rail engagement component may engage with the first flange and the second flange of the mounting rail.

The rail engagement component may include a receptacle (e.g., socket) that receives the fastener (or a portion thereof). The fastener serves to flex, bias, move, etc. the rail engagement component towards the first flange and the second flange of the mounting rail, as well as the solar module. For example, threads of the fastener may be received within the receptacle of the rail engagement component, and the end (e.g., point, butt, tip, etc.) of the fastener may be engaged with the clamp actuation component along the interior surface and proximate to the second end. During actuation of the fastener, the module engagement component and the rail engagement component are configured to clamp the solar module frame to the mounting rail. In an embodiment, the module engagement component applies a downward force against an outer surface of the mounting rail, while the rail engagement component applies a counteracting upward force. These two forces serve to secure the solar module frame to the mounting rail.

To further illustrate, as the fastener is tightened (e.g., rotated in a first direction, such as clockwise) into the receptacle, the end of the fastener comes into engagement with the interior surface of the clamp actuation component. During this instance, the rail engagement component, via the receptacle, may be threaded further onto the fastener (e.g., in a second direction). As the rail engagement component is further threaded onto the fastener, the rail engagement component may pivot and the end of the rail engagement component may come into engagement with the first flange and the second flange of the mounting rail. That is, the rail engagement component flexes at, or about, a point in which the rail engagement component extends from the clamp actuation component. At the same time, the end of the fastener urges or imparts movement to the module engagement component, external of the mounting rail, into engagement with the solar module. As the fastener is further tightened, the solar module becomes clamped to the mounting rail.

Conversely, as the fastener is loosened (e.g., rotated in a third direction opposite the first direction, such as counterclockwise), the rail engagement component, via the receptacle, may be unthreaded from the fastener (e.g., in a fourth direction opposite the second direction). During this instance, the rail engagement component may flex at the end where the rail engagement component extends from the clamp actuation component. As the rail engagement component translates along the fastener in the fourth direction, the end of the rail engagement component may disengage with the first flange and the second flange of the mounting rail. At the same time, the end of the fastener may no longer urge or impart movement to the module engagement component to engage with the solar module. As the fastener is further loosened, the solar module becomes loose, thereby uncoupling the solar module from the mounting rail and permitting the solar module and/or the clamping mechanism to be removed.

In an embodiment, the fastener may be oriented at an angle to make the fastener accessible from the top, side, end, etc. of the mounting rail. In an embodiment, a steeper angle may be more convenient to allow for easier tool access. In an embodiment, the fastener may be accessible via the top of the mounting rail, for example, by disposing a socket, driver, head, etc. into the channel and to engage the fastener.

Although the fastener is described as imparting certain movements to the module engagement component, the clamp actuation component, and/or the rail engagement component, in an embodiment the fastener may be configured to impart other movements (e.g., translational, pivotable, hinged, etc.) to the module engagement component, the clamp actuation component, and/or the rail engagement component other than described. Still, although the clamping mechanism is described in use with the fastener, the clamping mechanism may be used with different mechanisms in order to actuate the clamp actuation component. For example, bolt(s), shaft(s), pin(s), etc., may be used and any one of which may indicate a separate and distinct mechanism for actuating the actuation component.

Additionally, or alternatively, in an embodiment, the clamping mechanism (or rather the body) may not include the rail engagement component that is actuated via the fastener. In such embodiment, the end of the fastener may still engage with the interior surface of the clamp actuation component for causing the module engagement component to pivot and clamp the solar module frame. However, the fastener may be disposed through slits, slots, holes, etc. in the mounting rail and may be secured to the mounting rail in such manner. In an embodiment, the body of the clamping mechanism may include a wing, flange, etc. that may be bent to fit snugly within the channel of the mounting rail. The wing may be "C-shaped" or "U-shaped" and may be pressure fitted within the channel of the mounting rail.

In an embodiment, portions of the clamping mechanism that engage with the solar module frame and/or the mounting rail may include features that increase electrical bonding, respectively. For example, the module engagement component may include serrations, fasteners, ribs, etc. that locally deform a portion of the solar module frame in contact with the module engagement component. Additionally, the rail engagement component may include serrations, fasteners, ribs, etc. that locally deform a portion of the mounting rail. In an embodiment, the serrations, fasteners, ribs, etc. may puncture an anodized, a galvanized, and/or a painted layer of the solar module frame and/or the mounting rail, respectively to electrically bond the solar module frame to the mounting rail. As such, the clamping mechanism may provide a sufficient clamping force for coupling the solar module to the mounting, as well as features that ensure proper electrical bonding.

In an embodiment, the clamping mechanism may be a single part or multiple parts coupled together. In such instances, the clamping mechanism may be formed from a single piece of material (e.g., a single body) or multiple pieces of material (e.g., multiple bodies). For example, a first part of the clamping mechanism may include the module engagement component and the clamp actuation component, while a second part of the clamping mechanism may include the rail engagement component. In an embodiment, the first part and the second part may hingedly or pivotably couple to one another. However, although described as being formed from two parts, any number of separate and distinct parts, bodies, etc. may be used to form the clamping mechanism.

In an embodiment, the mounting rail may receive any number of the clamping mechanism, and any number of the clamping mechanisms may be configured to couple the solar module to the mounting rail. Moreover, any number of mounting rails may be used, and the mounting rails themselves may include any number of the clamping mechanisms. In an embodiment, the mounting rails and the clamping mechanisms are used to couple ends, sides (e.g., lateral and/or longitudinal), etc. of the solar module to the mounting rail(s).

The clamping mechanism may be manufactured from metal (e.g., aluminum), plastics, composites, and/or any combination thereof. Suitable manufacturing techniques include injection molding, stamping, casting, extrusion, and so forth. Post manufacturing techniques, such as milling, drilling, finishing, for example, may also be used.

In an embodiment, the clamping mechanism described herein may be installed without drilling through frames, brackets, or other components typically used to secure the solar modules on a surface. For example, the clamping mechanism may be conveniently disposed within the mounting rail, and thereafter, via actuation of the fastener, may couple the solar module to the mounting rail. Also, the monolithic and modular nature of the clamping mechanism may allow for easier installation and breakdown. Moreover, embodiments that may be monolithic and/or have minimal components result in a reduced number of parts, thereby simplifying manufacturing and assembly.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIGS. 1A-1D illustrate an example clamping mechanism 100, according to an embodiment of the present disclosure. Generally, the clamping mechanism 100 may include a first side 102, a second side 104 spaced apart from the first side 102 (e.g., in the X-direction), a third side 106, a fourth side 108 spaced apart from the third side 106 (e.g., in the Z-direction), a fifth side 110, and a sixth side 112 spaced apart from the fifth side 110 (e.g., in the Y-direction).

The clamping mechanism 100 includes a body 114 that defines a module engagement component 116, a clamp actuation component 118, and a rail engagement component 120. The module engagement component 116 is configured to be disposed external to a channel of a mounting rail for engaging with a solar module frame, while the clamp actuation component 118 is configured to be disposed internal to the channel. The module engagement component 116 may be disposed along the sixth side 112 of the clamping mechanism 100, while the clamp actuation component 118 may be disposed along the fifth side 110 of the clamping mechanism 100.

The body 114 may also include a first end 122 defined by the module engagement component 116 and which is configured to apply a force against the solar module frame. A second end 124 of the body 114 may be defined by the clamp actuation component 118. As shown, and in an embodiment, the body 114 may be generally "U shaped," or similarly, "C shaped." In an embodiment, the rail engagement component 120 extends from the clamp actuation component 118, for example, from an interior surface 126 of the body 114, along the clamp actuation component 118 and at a location between the first end 122 and the second end 124. The rail engagement component 120 may flexibly extend from the clamp actuation component 118, such that the rail engagement component 120 may flex, bend, curve, etc. to clamp the mounting rail.

The rail engagement component 120 defines a socket 128 for receiving a fastener 130, as well as an end 132 that is configured to engage with the mounting rail. As shown, the first end 122 of the body 114 and the end 132 of the rail engagement component 120 may be separated by a gap distance 134. During actuation of the fastener 130, the gap distance 134 may be lessened in order to clamp the solar module frame to the mounting rail. The fastener 130 is disposed within the socket 128 of the rail engagement component 120, and when actuated (e.g., rotated), engages with the interior surface 126 proximate to the second end 124. To secure the solar module frame to the mounting rail, the fastener 130 may be actuated (e.g., tightened), and in turn, an end 136 of the fastener 130 engages the interior surface 126. This engagement causes the first end 122 and the end 132 of the rail engagement component 120 to clamp the solar module frame (e.g., the gap distance 134 is lessened). For example, the fastener 130 may serve to flex, bias, etc. the rail engagement component 120 towards mounting rail, as well as the solar module frame, and rotate the module engagement component 116 towards the mounting rail and the solar module frame. The solar module frame and a portion of the mounting rail may become pinched, or clamped, between the first end 122 and the end 132 of the rail engagement component 120.

The clamp actuation component 118 and the rail engagement component 120 may include a first width 138 (e.g., in the Z-direction) that is less than a width of the channel of the mounting rail. In doing so, the clamp actuation component 118 and the rail engagement component 120 may be insertable into, and disposed within, the channel. Moreover, the body 114 may define a first groove 140 disposed along the third side 106, and a second groove 142 disposed along the fourth side 108. The first groove 140 may receive a first flange of the mounting rail, while the second groove 142 may receive a second flange of the mounting rail. The disposition of the first flange within the first groove 140 and the second flange within the second groove 142 may assist is seating, positioning, or orienting the clamping mechanism 100 to the mounting rail. A portion of the body 114 disposed between the first groove 140 and the second groove 142 may include a second width 148 that is less than the first width 138.

In an embodiment the end 132 of the rail engagement component 120 includes rib(s) 144 that engage with flanges of the mounting rail. For example, the rib(s) 144 may engage with the first flange and the second flange of the mounting rail. In an embodiment, the rib(s) 144 locally deform a portion of the first flange and/or the second flange (e.g., score, pierce, dig into, etc.) for electrically bonding to the mounting rail. In an embodiment, the rib(s) 144 may puncture an anodized, a galvanized, and/or a painted layer of the mounting rail to electrically bond the clamping mechanism 100 and the mounting rail. Additionally, or alternatively, the first end 122 of the body 114 may include one or more fastener(s) 146, such as a first fastener 146(1) and a second fastener 146(2). The first fastener 146(1) may be disposed along the third side 106, while the second fastener 146(2) may be disposed along the fourth side 108. The first fastener 146(1) and the second fastener 146(2) may puncture an anodized, a galvanized, and/or a painted layer of the solar module frame to electrically bond the solar module frame to the mounting rail. For example, the first fastener 146(1) and the second fastener 146(2) may be deform a portion of the solar module frame. In other words, as the first fastener 146(1) and the second fastener 146(2) forced into the to the solar module frame, via rotation of the fastener 130, a portion of the first fastener 146(1) and the second fastener 146(2) (e.g., head) may score, pierce, dig into, etc. the solar module frame (e.g., an anodized, a galvanized, and/or a painted layer) to electrically bond the solar module frame and the clamping mechanism 100. The module engagement component 116 (or the body 114) may include receptacles for receiving the first fastener 146(1) and the second fastener 146(2). In an embodiment, the first fastener 146(1) and the second fastener 146(2) may be actuated to in order to deform the solar module frame.

In an embodiment, the fastener 130 may be oriented at an angle (e.g., relative to vertical) to make the fastener 130 accessible from a top, end, etc. of the mounting rail. In an embodiment, a steeper angle may be more convenient to allow for easier tool access. In an embodiment, the fastener 130 may be accessible via a top or side of the mounting rail, for example, by disposing a socket, driver, head, etc. into the channel and to engage the fastener 130.

FIGS. 2A-2D illustrate an example coupling of a solar module frame 200 to a mounting rail 202 using the clamping mechanism 100, according to an embodiment of the present disclosure.

The mounting rail 202 includes a top 204, a bottom 206, and a channel 208. The channel 208 may extend a lengthwise direction of the mounting rail 202 (e.g., in the X-direction), and have a cross-sectional dimension 210 (e.g., a width, in the Z-direction) disposed between adjacent surface, sides, etc. of the channel 208, such as a first sidewall 212 and a second sidewall 214. As shown, the solar module frame 200 may be disposed along the top 204. The bottom 206, meanwhile, and although not shown, may be disposed along a surface (e.g., roof). The channel 208 may be open (e.g., via an opening) at the top 204 to permit at least a portion of the body 114 to extend therethrough (e.g., the module engagement component 116).

The mounting rail 202 also includes a first flange 216 and a second flange 218. The first flange 216 may extend from the first sidewall 212 (e.g., transverse thereto) and the second flange 218 may extend from the second sidewall 214 (e.g., transverse thereto). As shown, the first flange 216 and the second flange 218 may be disposed along the top 204. Additionally, the opening of the channel 208 may be disposed between the first flange 216 and the second flange 218. Here, at least a portion of the first flange 216 may be disposed within the first groove 140, and at least a portion of the second flange 218 may be disposed within the second groove 142. The positioning of the first flange 216 within the first groove 140 and the second flange 218 within the second groove 142 may permit the clamping mechanism 100 to slide along a lengthwise direction of the mounting rail 202 (prior to securing the clamping mechanism 100 to the mounting rail 202).

As shown, the clamp actuation component 118 and the rail engagement component 120 are disposed within the channel 208. The module engagement component 116 is disposed external to the channel 208 for engaging with the solar module frame 200, such as a flange 220 of the solar module frame 200. The fastener 130 is shown disposed within the socket 128 of the rail engagement component 120.

Figure 2A:
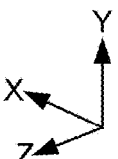
FIGS. 2A-2D illustrate an example use of the clamping mechanism of FIGS. 1A-1D, according to an embodiment of the present disclosure.
Figure 2B:
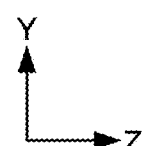
Figure 2C:
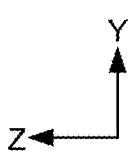
Figure 2D:
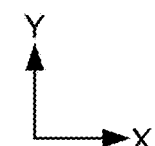

Actuation of the clamping mechanism 100 is described with regard to FIG. 2D, which illustrates a cross-sectional view of the clamping mechanism 100, the solar module frame 200, and the mounting rail 202, taken along line A-A of FIG. 2C. To secure the solar module frame 200 to the mounting rail 202, the fastener 130 may be actuated (e.g., tightened) in a first direction 222. The first direction 222 may be clockwise about the X-axis. As the fastener 130 is actuated in the first direction 222, the end 136 of the fastener 130 comes into engagement with the interior surface 126 of the body 114, along the clamp actuation component 118 and proximate to the second end 124. At the same time, or substantially simultaneous therewith, as the fastener 130 is further threaded into the rail engagement component 120 the fastener 130 translates in a second direction 224. The engagement between the end 136 of the fastener 130 with the clamp actuation component 118, and the threading of the fastener 130 through the rail engagement component 120, causes the body 114 to rotate in a third direction 226 (e.g., about the Z-axis) and the rail engagement component 120 to move in a fourth direction 228 (e.g., along the Y-axis). Rotation of the body 114 in the third direction 226 causes the module engagement component 116 to apply a first force 230 against the flange 220 of the solar module frame 200. Movement of the rail engagement component 120 in the fourth direction 228 causes the end 132 of the rail engagement component 120 to apply a second force 232 against the first flange 216 and the second flange 218 of the mounting rail 202. That is, as the fastener 130 is threaded into the socket 128, the rail engagement component 120 translates in the fourth direction 228 and the end 132 of the rail engagement component 120 comes into contact with the first flange 216 and the second flange 218. During actuation of the fastener 130 in the first direction 222, the module engagement component 116 and the rail engagement component 120 are configured to clamp the solar module frame 200 to the mounting rail 202, via the first force 230 and the second force 232, respectively.

To uncouple the solar module frame 200 from the mounting rail 202, the fastener 130 may be rotated in a fifth direction that is opposite the first direction 222. The fifth direction may be counterclockwise about the X-axis. As the fastener 130 is actuated in the fifth direction, the end 136 of the fastener 130 may no longer urge the clamp actuation component 118 in the second direction 224, and the unthreading of the socket 128 from the fastener 130 causes the fastener 130 to translate in a sixth direction that is opposite the second direction 224. At the same time, as the fastener 130 no longer urges the clamp actuation component 118, the body 114 rotate in a seventh direction (e.g., about the Z-axis). The seventh direction may be opposite the third direction 226. Therein, the end 132 of the rail engagement component 120 may disengage with the first flange 216 and the second flange 218 of the mounting rail 202 and move in an eighth direction that is opposite the fourth direction 228. Here, as the end 136 of the fastener 130 may no longer urge the module engagement component 116 into engagement with the solar module frame 200, the solar module frame 200 becomes loose, thereby uncoupling the solar module frame 200 from the mounting rail 202 and permitting the solar module frame 200 and/or the clamping mechanism 100 to be removed.

The clamping mechanism 100 is also configured to electrically bond the solar module frame 200 to the mounting rail 202. The electrical bonding may occur, at least in part, via the clamping mechanism 100. For example, the rib(s) 144 and/or the fastener(s) 146 may deform a portion of the mounting rail 202 (e.g., the first flange 216 and the second flange 218) and the solar module frame 200, respectively. In an embodiment, the fastener(s) 146 may be actuated (e.g., tightened or loosened) after the solar module frame 200 becomes clamped to the mounting rail 202 to deform a portion of the flange 220.

The solar module frame 200, although not shown, may receive a solar module. For example, a solar module (or components thereof) may be received within a receptacle 234 of the solar module frame 200. Additionally, although a particular shape, profile, size, etc. of the solar module frame 200 is shown, or that the module engagement component 116 engages with a particular portion of the solar module frame 200 (e.g., the flange 220), the module engagement component 116 may engage with other portions of the solar module frame 200.

Although a single clamping mechanism 100 is shown being coupled to the mounting rail 202, in an embodiment, the mounting rail 202 may receive any number of the clamping mechanisms 100, and any number of the clamping mechanisms 100 may be configured to couple the solar module to the mounting rail 202. Moreover, any number of mounting rails 202 may be used, and the mounting rails 202 themselves may include any number of the clamping mechanisms 100.

The clamping mechanism 100 may be manufactured from metal (e.g., aluminum), plastics, composites, and/or any combination thereof. Suitable manufacturing techniques include injection molding, stamping, casting, extrusion, and so forth. Post manufacturing techniques, such as milling, for example, may also be used to form the socket 128 (e.g., with threads).

FIGS. 3A-3C illustrate a clamping mechanism 300, according to an embodiment of the present disclosure. The clamping mechanism 300 may include a first body 302 and a second body 304. The first body 302 defines a rail engagement component 306 that may be at least partially disposed within a channel of a mounting rail. The first body 302 includes a first strut 308 (e.g., panel, flange, wall, etc.) and a second strut 310 (e.g., panel, flange, wall, etc.) that extends from the first strut 308. In an embodiment, the second strut 310 extends transversely from the first strut 308. The first strut 308 is configured to be disposed external to the channel of the mounting rail, while the second strut 310 is configured to be at least partially disposed internal to the channel of the mounting rail.

The first body 302 further includes a first arm 312, which may extend from, or be a component of, the first strut 308. The first arm 312 may also include an end 314 that defines a first socket 316. As will be explained herein, the first socket 316 may be configured to receive a portion of a second arm 318 that extends from the second body 304. The first arm 312, including the first socket 316, may extend external to the channel of the mounting rail for engaging with the second arm 318.

The first strut 308 may include a flange 320 that is spaced apart from the second flange by a distance 322. In an embodiment, the distance 322 may accommodate a thickness (e.g., in the X-direction) of the mounting rail. When installed, the mounting rail may be disposed between the second strut 310 (e.g., a surface thereof) and the flange 320.

The second strut 310 includes a second socket 324 that receives a fastener 328. For example, the fastener 328 may be threaded into the second socket 324. The second strut 310 may also include a wing component 326 that extends from an end of the second strut 310 (opposite to where the second strut 310 extends from the first strut 308). The wing component 326 may include a curved profile (e.g., flare, loop, etc. in the X-direction) and at least partially loop over the second strut 310 (e.g., in the Y-direction). The wing component 326 may be biasable in the X-direction to at least partially collapse (e.g., compress, squeeze, etc.) the wing component 326 (e.g., X-direction). The biasing nature of the wing component 326 may provide a biasing force against sidewalls of the mounting rail to at least partially assist in coupling the first body 302 (or the rail engagement component 306) to the mounting rail.

The second body 304 includes a module engagement component 330 and a clamp actuation component 332. The second body 304 may include a first end 334 defined by the module engagement component 330 and which is configured to apply a force against a solar module frame. A second end 336 of the second body 304 may be defined by the clamp actuation component 332. As introduced above, the second body 304 includes the second arm 318, which in an embodiment, extends from the clamp actuation component 332, such as an interior surface 338 of the second body 304 along the clamp actuation component 332.

The second arm 318 includes an end 340 that has a shaft 342 (e.g., pole, thickened region, rod, etc.) configured to be disposed at least partially within the first socket 316 for hingedly coupling the first body 302 and the second body 304. In an embodiment, the shaft 342 is slid into engagement with the first socket 316, or may be snapped into engagement with the first socket 316. The coupling between the shaft 342 and the first socket 316 may resemble a hinged connection to permit the second body 304 to rotate during actuation of the clamping mechanism 100 to couple the solar module frame to the mounting rail.

The fastener 328 may be received within the second socket 324, and an end 344 of the fastener 328 is configured to engage with the interior surface 338 of the second body 304 proximate to the second end 336. In an embodiment, the clamp actuation component 332 includes a receptacle 346 that receives the end 344 of the fastener 328. The receptacle 346 may be formed by the interior surface 338. During actuation of the fastener 328, and as will be explained herein, the second body 304 may rotate (e.g., about the Z-axis) to bring the first end 334 of the second body 304 into engagement with the solar module frame. In doing so, the module engagement component 330 may secure the solar module frame to the mounting rail.

The clamping mechanism 300 may be manufactured from metal (e.g., aluminum), plastics, composites, and/or any combination thereof. Suitable manufacturing techniques include injection molding, stamping, casting, extrusion, and so forth. Post manufacturing techniques, such as milling, for example, may also be used to form the second socket 324 (e.g., with threads).

FIG. 4 illustrate the first body 302 of the clamping mechanism 300, according to an embodiment of the present disclosure. As introduced above, the first body 302 may include the first strut 308, the second strut 310, the first arm 312, and may also define the rail engagement component 306 and the wing component 326. The second body 304 also defines the flange 320, the mounting rail may be disposed between the flange 320 and the second strut 310 when the clamping mechanism 300 couples to the mounting rail.

In an embodiment, the first strut 308 may include an upper surface 400 and a lower surface 402, opposite the upper surface 400. A portion of the solar module frame may rest, or be disposed along, the upper surface 400. In an embodiment, the upper surface 400 may include one or more grooves 404 that extend across a width of the first body 302 (e.g., in the Z-direction). The lower surface 402, or a portion thereof, may abut an end of the mounting rail.

The first strut 308, or the first arm 312, includes the first socket 316 that receives the end 344 of the second arm 318 (e.g., the shaft 342). The second strut 310 defines the second socket 324 through which at least a portion of the fastener 328 is disposed. The second socket 324 may be threaded for engaging the fastener 328.

FIG. 5 illustrates the second body 304 of the clamping mechanism 300, according to an embodiment of the present disclosure. As introduced above, the second body 304 includes the module engagement component 330 and the clamp actuation component 332. The first end 334 of the second body 304 is disposed at an end of the module engagement component 330, while the second end 336 of the second body 304 is disposed at an end of the clamp actuation component 332. The receptacle 346 is formed on the interior surface 338 of the second body 304, proximate to the second end 336, and is configured to receive the end 344 of the fastener 328. In an embodiment, the disposition of the end 344 of the fastener 328 in the receptacle 346 may prevent the fastener 328 disengaging (e.g., slipping off) the second body 304. The second body 304 also defines the second arm 318, which includes the end 340 having the shaft 342. The shaft 342 is insertable into the first socket 316 of the first arm 312.

In an embodiment, the interior surface 338 of the second body 304, along the module engagement component 330 or at the first end 334, includes a nipple 500. The nipple 500 may include a leading edge, a serrated edge, etc. that is configured to deform a portion of the solar module frame for electrically bonding the clamping mechanism 300 to the mounting rail.

FIGS. 6A-6D illustrates an example coupling of a solar module frame 600 to a mounting rail 602 using the clamping mechanism 300, according to an embodiment of the present disclosure.

The mounting rail 602 may include a channel 604 in which a portion of the rail engagement component 306 of the clamping mechanism 300 is disposed. For example, the rail engagement component 306 may be at least partially inserted into, and/or disposed within, the channel 604. In an embodiment, the channel 604 may be "C-shaped." In an embodiment, the mounting rail 602 may include bends, curvatures, etc. to support the solar module at a desired angle.

As introduced above, the first body 302 may include the first strut 308 (e.g., flange, panel, member, etc.) and the second strut 310 (e.g., flange, panel, member, etc.). The first body 302 also includes the first arm 312 that extends from the first strut 308, and the first arm 312 has the first socket 316 for receiving the second arm 318 of the second body 304. The second strut 310 extends from the first strut 308 (e.g., the lower surface 402) and includes the second socket 324 that receives the fastener 328. Further, the wing component 326 extends from the second strut 310 for engaging an interior of the channel 604. The wing component 326 may be biased (e.g., in the X-direction) to engage with the interior of the channel 604 to at least assist in coupling the clamping mechanism 300 to the mounting rail 602. When coupled to the mounting rail 602, the first strut 308, such as the lower surface 402, may abut an end of the mounting rail 602. Additionally, the mounting rail 602 may be disposed between the second strut 310 and the flange 320. As also shown, a portion of the solar module frame 600 may rest on the upper surface 400 of the first strut 308.

The second body 304 includes the module engagement component 330 and the clamp actuation component 332. As discussed above, the first end 334 of the second body 304 may be disposed at an end of the module engagement component 330 and is configured to apply a force against a flange 606 of the solar module frame 600. The second end 336 of the second body 304 may be disposed at an end of the clamp actuation component 332, and the end 344 of the fastener 328 engages the interior surface 338 of the second body 304 proximate to the second end 336 (e.g., within the receptacle 346). The second arm 318 of the second body 304 extends, for example, from the clamp actuation component 332. The second arm 318 is disposed at least partially within the second socket 324 for hingedly coupling the first body 302 and the second body 304. More particularly, the shaft 342 at the end 340 of the second arm 318 may be disposed within the second socket 324.

Figure 6A:
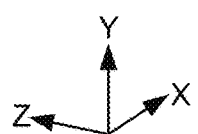
FIGS. 6A-6D illustrate an example use of the clamping mechanism of FIGS. 3A-3C, according to an embodiment of the present disclosure.
Figure 6B:
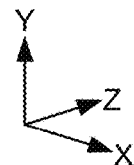
Figure 6C:
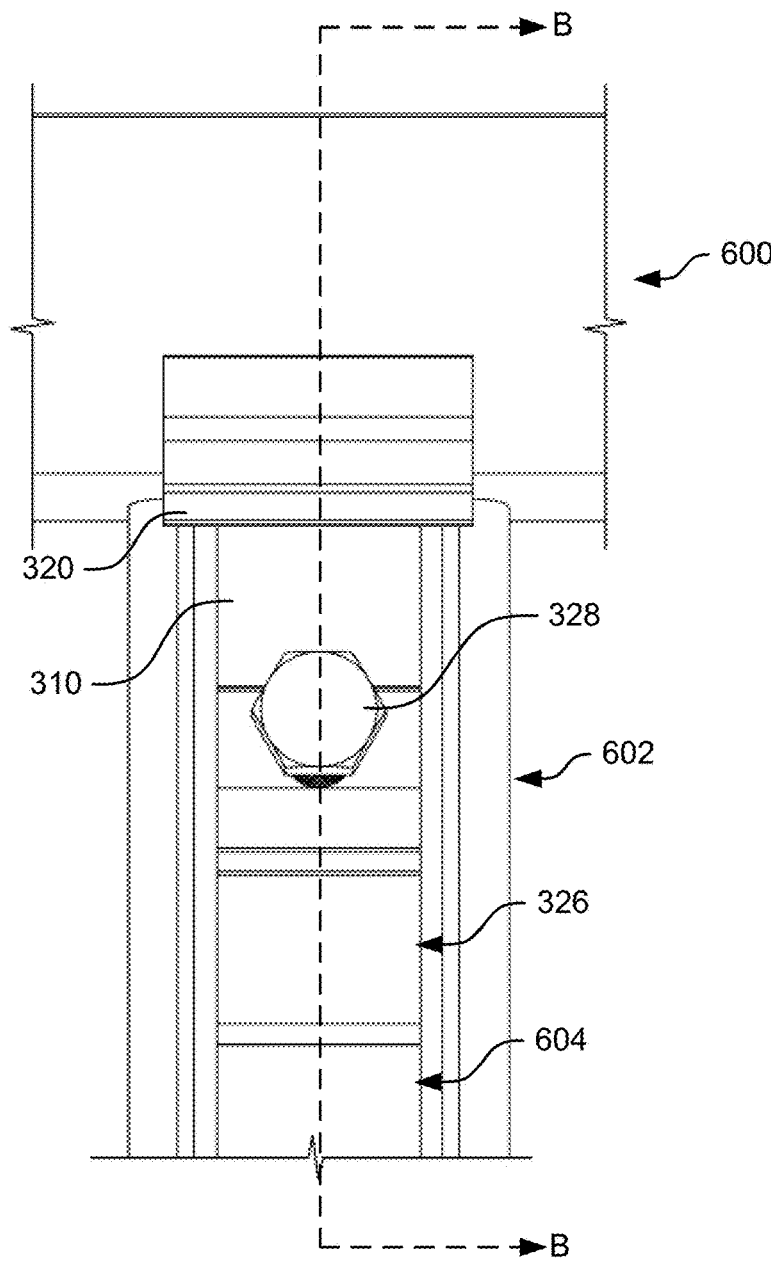
Figure 6C:
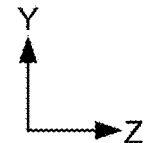
Figure 6D:
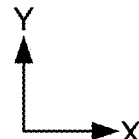

Actuation of the clamping mechanism 300 is described with regard to FIG. 6D, which illustrates a cross-sectional view of the clamping mechanism 300, the solar module frame 600, and the mounting rail 602, taken along line B-B of FIG. 6C. To clamp the solar module frame 600 to the mounting rail 602, the fastener 328 may be actuated in a first direction 608 (e.g., clockwise about the X-axis). As the fastener 328 is actuated, the end 340 of the fastener 328 contacts the interior surface 338 along the clamp actuation component 332. The engagement between the end 340 of the fastener 328 and the clamp actuation component 332, or the movement of the fastener 328 in a second direction 610, causes the second body 304 to rotate in a third direction 612 (e.g., clockwise about the Z-axis). As the second body 304 rotates in the third direction 612, the first end 334 of the second body 304, or the module engagement component 330, contacts the flange 606 of the solar module frame 600. In doing so, a force 614 is applied against the flange 606, thereby coupling the solar module frame 600 to the mounting rail 602. The rotation of the second body 304 in the third direction 612 is accomplished at least in part via the hinged engagement between the second arm 318 (e.g., the shaft 342) and the second socket 324.

Conversely, to unclamp the solar module frame 600 from the mounting rail 602, the fastener 328 may be actuated in a fourth direction (e.g., counterclockwise about the X-axis, opposite the first direction 608). As the fastener 328 is loosened, the fastener 328 may no longer urge against the interior surface 338 along the clamp actuation component 332. This disengagement between the end 344 of the fastener 328 and the clamp actuation component 332, or the movement of the fastener 328 in a fifth direction (e.g., opposite the second direction 610), permits the second body 304 to rotate in a sixth direction (e.g., counterclockwise about the Z-axis, opposite the third direction 612). As the second body 304 rotates in the sixth direction, the first end 334 of the second body 304, or the module engagement component 330, may disengage the flange 606 of the solar module frame 600, thereby uncoupling the solar module frame 600 from the mounting rail 602. The rotation of the second body 304 in the sixth direction is accomplished at least in part via the hinged engagement between the second arm 318 (e.g., the shaft 342) and the second socket 324.

In an embodiment, the fastener 328 may be disposed through an opening, slit, slot, etc. of the mounting rail 602. In an embodiment, the opening, slit, slot, etc. may be pre-formed in the mounting rail 602, at a certain distance offset from the end 340 of the mounting rail 602. Alternatively, in an embodiment, the opening, slit, slot, etc. may be formed in the mounting rail 602 at a time of installation. The fastener 328 may be received in the second socket 324 at a location within (e.g., internal) to the channel 604 or external to the channel 604.

Figure 7A:
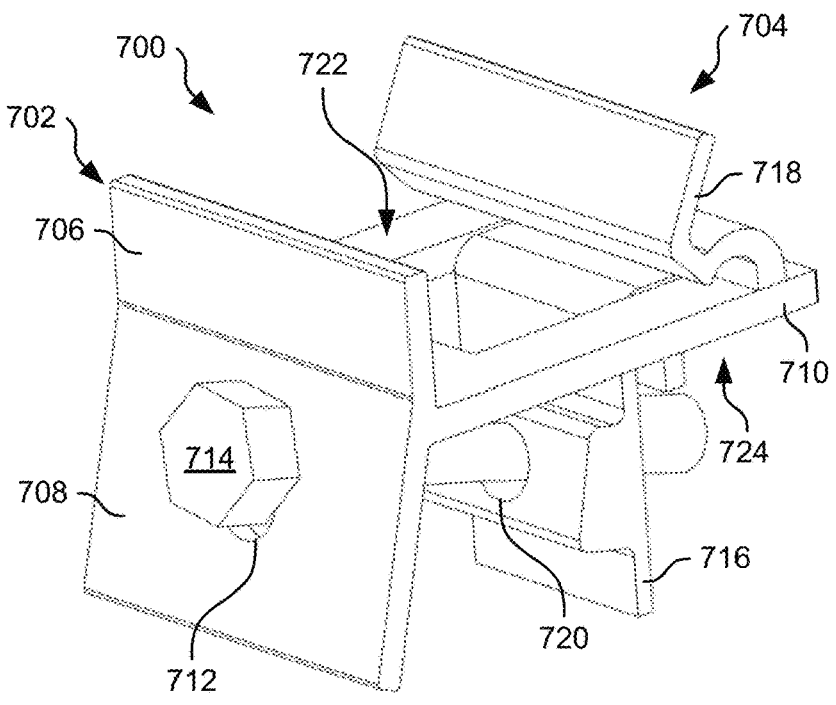
FIGS. 7A-7C illustrate an example clamping mechanism configured to secure a solar module to a mounting rail, according to an embodiment of the present disclosure.
Figure 7A:
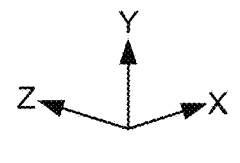
Figure 7B:
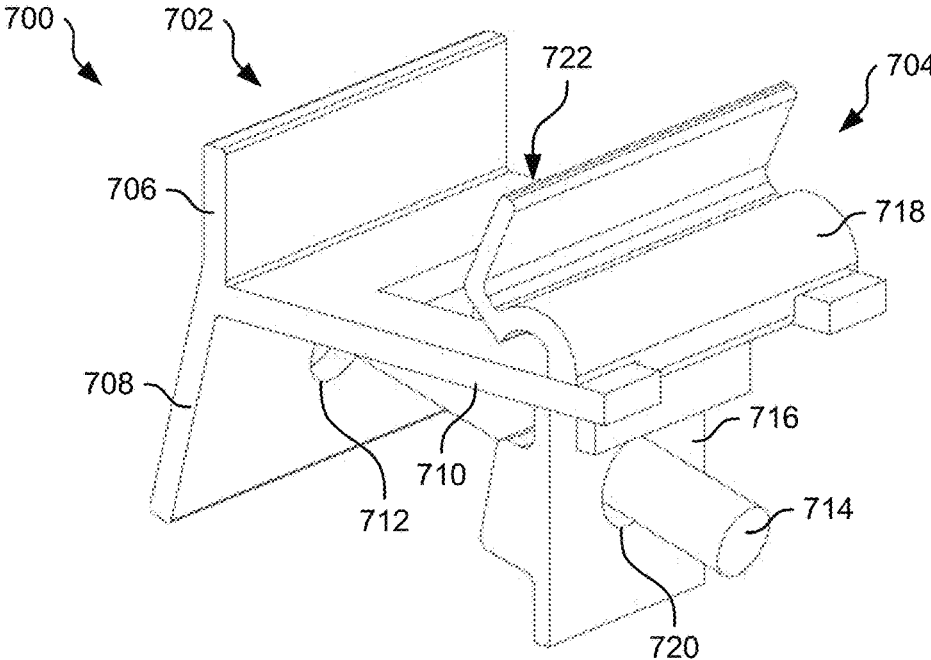
Figure 7B:
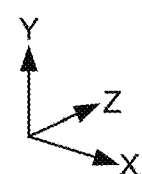
Figure 7C:
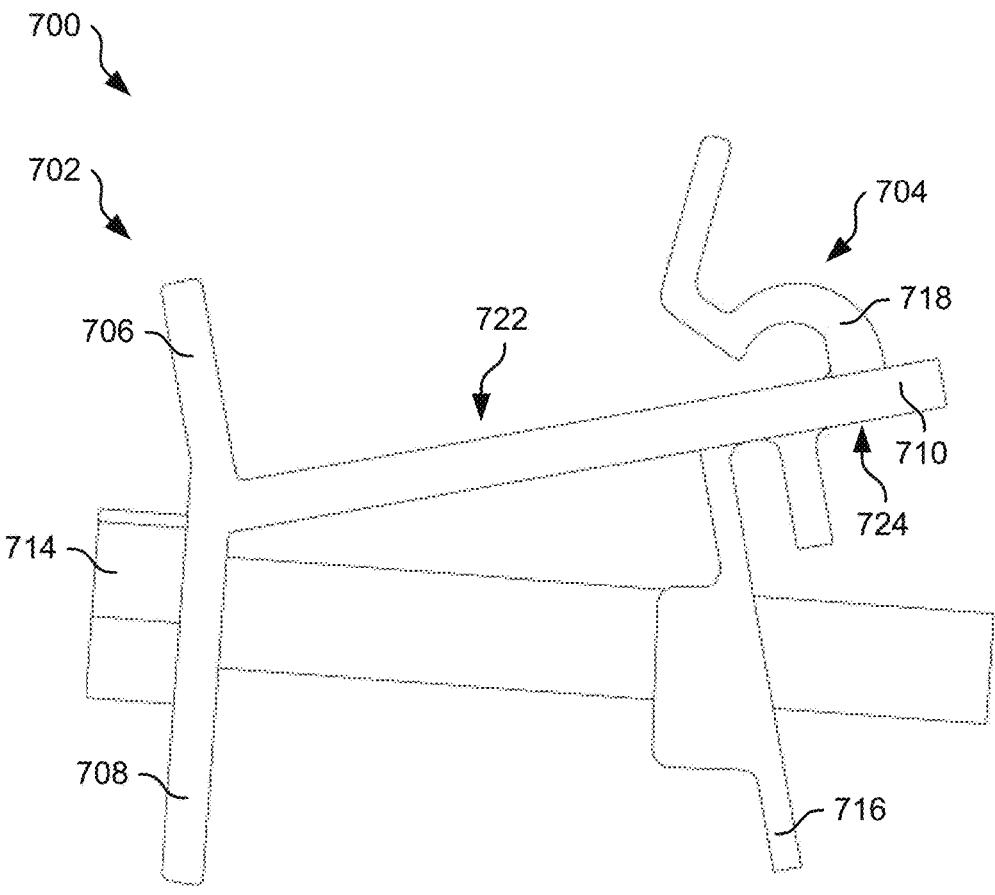
Figure 7C:

FIGS. 7A-7C illustrates a clamping mechanism 700, according to an embodiment of the present disclosure. The clamping mechanism 700 may include a first body 702 and a second body 704. The first body 702 may include a first flange 706 (e.g., wall, panel, etc.), a second flange 708 (e.g., wall, panel, etc.), and a third flange 710 (e.g., wall, panel, etc.). In an embodiment, the first flange 706 and the second flange 708 may be rigid and extend in transverse directions relative to one another (e.g., opposing directions along the Y-axis). The third flange 710 may extend transversely from the first flange 706 and the second flange 708 (e.g., in the X-direction). In an embodiment, the third flange 710 extends orthogonally from the first flange 706. The second flange 708 may also include an opening 712 in which a fastener 714 is at least partially disposed through.

The second body 704 may include a rail engagement component 716 and a module engagement component 718. The second body 704 may be distinct and separate from, but interconnected or interconnectable with, the first body 702 via the fastener 714. For example, the rail engagement component 716 of the second body 704 may include a socket 720 that receives the fastener 714. For example, the fastener 714 may be threaded into, and unthreaded from, the rail engagement component 716 via the socket 720, thereby coupling the first body 702 and the second body 704.

During installation, or a coupling of the clamping mechanism 700 to a mounting rail, the rail engagement component 716 may be disposed at least partially within a channel of the mounting rail. The module engagement component 718, however, extends external to the channel of the mounting trail and beyond (e.g., vertical of) the third flange 710. When coupled to the clamping mechanism 700, a solar module frame may be disposed between (e.g., in the X-direction) the module engagement component 718 and the first flange 706. Additionally, a portion of the solar module frame may rest on the third flange 710, such as on a first surface 722 of the third flange 710, opposite a second surface 724 that abuts (or faces) the mounting rail. In an embodiment a portion of the second body 704, such as a portion of the module engagement component 718, may rest on the first surface 722.

The clamping mechanism 700 may be manufactured from metal (e.g., aluminum), plastics, composites, and/or any combination thereof. Suitable manufacturing techniques include injection molding, stamping, casting, extrusion, and so forth. Post manufacturing techniques, such as milling, for example, may also be used to form the socket 720 (e.g., with threads).

FIG. 8 illustrates the first body 702 of the clamping mechanism 700, according to an embodiment of the present disclosure. As introduced above, the first body 702 includes the first flange 706, the second flange 708, and the third flange 710. The second flange 708 includes the opening 712. The third flange 710 includes the first surface 722 and the second surface 724.

As also shown, the third flange 710 may include a slot 800, for example, configured to receive at least a portion of the second body 704 (e.g., the module engagement component 718). In an embodiment, the third flange 710 may have a fork or prong shaped design, where the slot 800 may be disposed between the prongs. In an embodiment, a portion of the second body 704 may rest on, or against, the first surface 722, along the prongs.

Figure 9A:
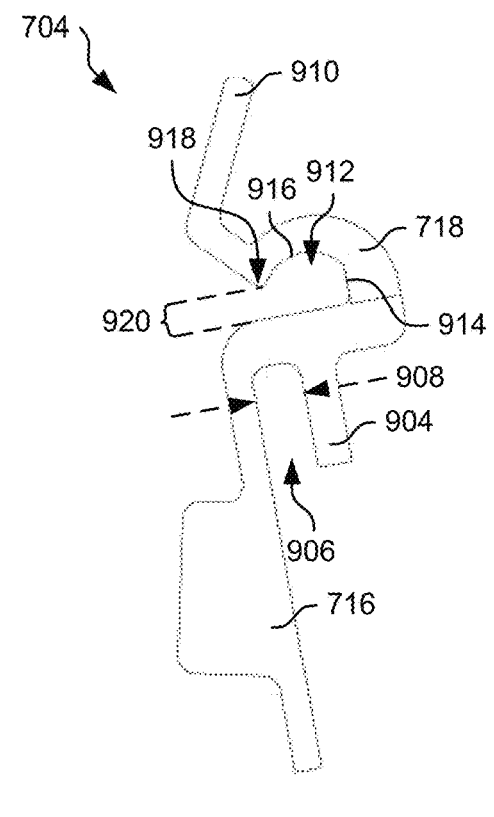
FIGS. 9A and 9B illustrate a second body, or portion, of the clamping mechanism of FIGS. 7A-7C, according to an embodiment of the present disclosure.
Figure 9B:
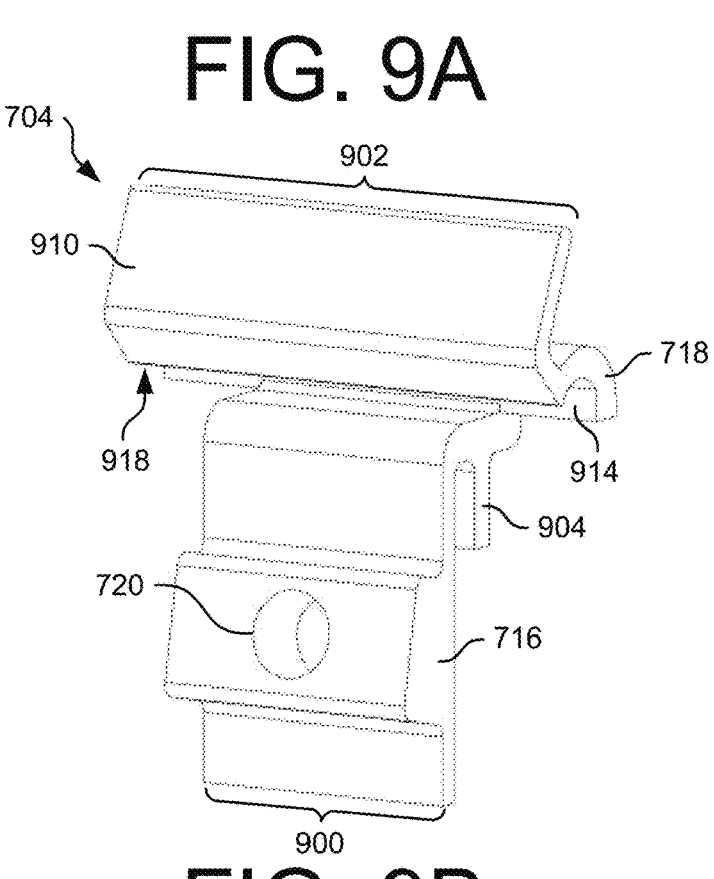

FIGS. 9A and 9B illustrate the second body 704 of the clamping mechanism 700, according to an embodiment of the present disclosure. As introduced above, the second body 704 includes the rail engagement component 716 and the module engagement component 718. The rail engagement component 716 may include the socket 720 for receiving the fastener 714. The rail engagement component 716 may have a first width 900 (e.g., in the Z-direction) that is less than a second width 902 (e.g., in the Z-direction) of the module engagement component 718. The first width 900 permits the rail engagement component 716 to be inserted into a channel of a mounting rail, for example.

The second body 704 may also include a flange 904 that at least partially defines a slot 906, for example. A portion of the mounting rail may be disposed within the slot 906 for securing the second body 704 to the mounting rail. In an embodiment, the slot 906 may include a depth 908 (e.g., in the X-direction) that accommodates a thickness (e.g., side-wall thickness) of the mounting rail.

The module engagement component 718 may include a tab 910, for example, which may be biased in a direction or about an axis (e.g., about the Z-axis). In an embodiment, the tab 910 may be deflected to allow for insertion of the solar module frame within the module engagement component 718. For example, the module engagement component 718 may include a channel 912 that receives at least a portion of the solar module frame, and within which the solar module frame is insertable. In an embodiment, the channel 912 may be defined at least in part by a rear surface 914 and a top surface 916. When inserted into the channel 912, an end of the solar module frame may abut the rear surface 914. The top surface 916 may come to a point 918, which may be spaced apart from the rail engagement component 716 by a distance 920. In an embodiment, the distance 920 may be increased via deflecting the tab 910. The point 918 may deform at least a portion of the solar module frame for electrically grounding the solar module.

FIGS. 10A-10D illustrate an example coupling of a solar module frame 1000 to a mounting rail 1002 using the clamping mechanism 700, according to an embodiment of the present disclosure. In an embodiment, the mounting rail 1002 may be similar to the mounting rail 602.

As introduced above, the clamping mechanism 700 may include the first body 702 having the first flange 706 and the second flange 708. The first flange 706 and the second flange 708 may extend transversely from one another. Additionally, the first body 702 may include the third flange 710 that extends transversely from the first flange 706 and the second flange 708, such that when installed on the mounting rail 1002, the third flange 710 extends across an end 1004 of the mounting rail 1002. As shown, the mounting rail 1002 may be configured to reside on the third flange 710 and may abut the first flange 706. The second surface 724 of the third flange 710 may abut the end 1004 of the mounting rail 1002.

The rail engagement component 716 of the clamping mechanism 700, which may be formed from the second body 704 of the clamping mechanism 700, is at least partially disposed within a channel 1006 of the mounting rail 1002. Additionally, the second body 704 also defines the module engagement component 718 that extends beyond the end 1004 of the mounting rail 1002 and the third flange 710. The first width 900 of the rail engagement component 716 may be disposed within the slot 800 of the third flange 710. The rail engagement component 716 of the second body 704 further includes the socket 720 that receives the fastener 714. For example, the fastener 714 may be threaded into the socket 720. The rail engagement component 716 may also include the flange 904, for example, which couples the second body 704 to the mounting rail 1002.

Figure 10A:
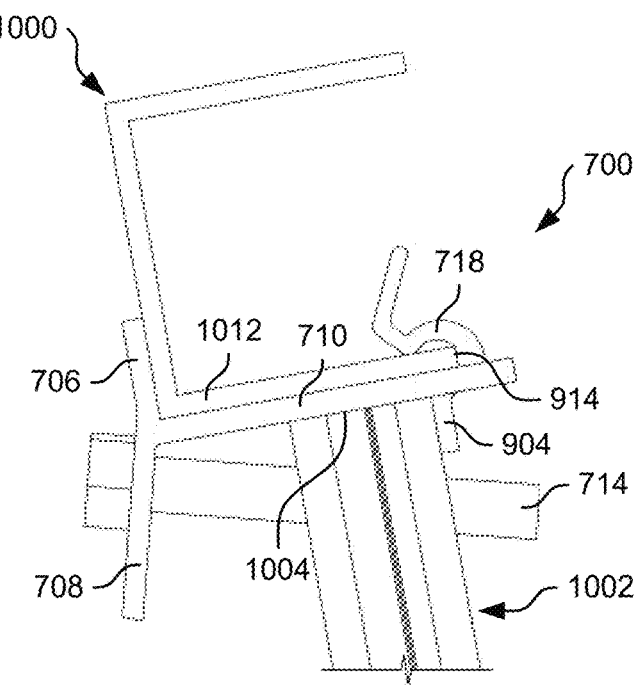
FIGS. 10A-10D illustrate an example use of the clamping mechanism of FIGS. 7A-7C, according to an embodiment of the present disclosure.
Figure 10A:
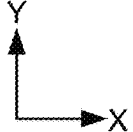
Figure 10B:
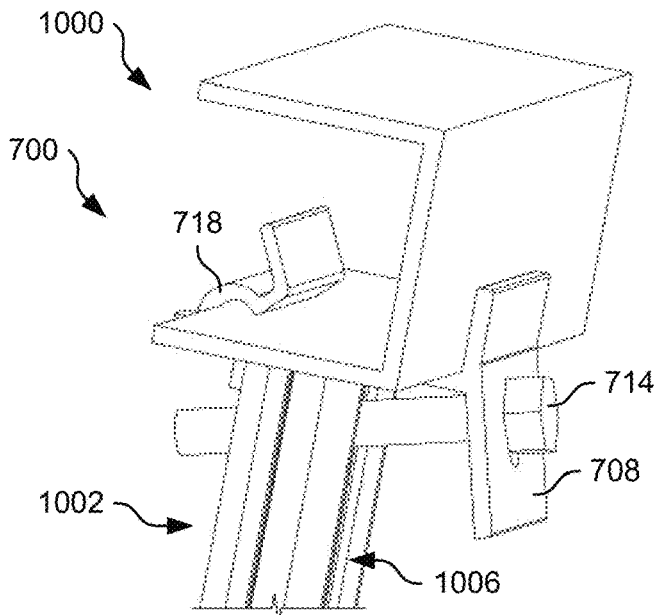
Figure 10B:
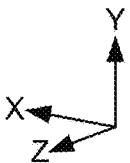
Figure 10C:
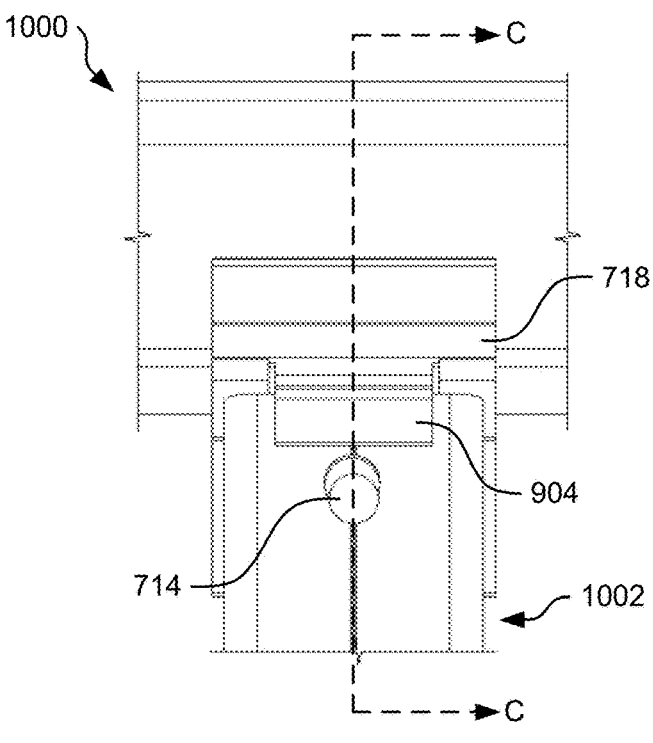
Figure 10D:
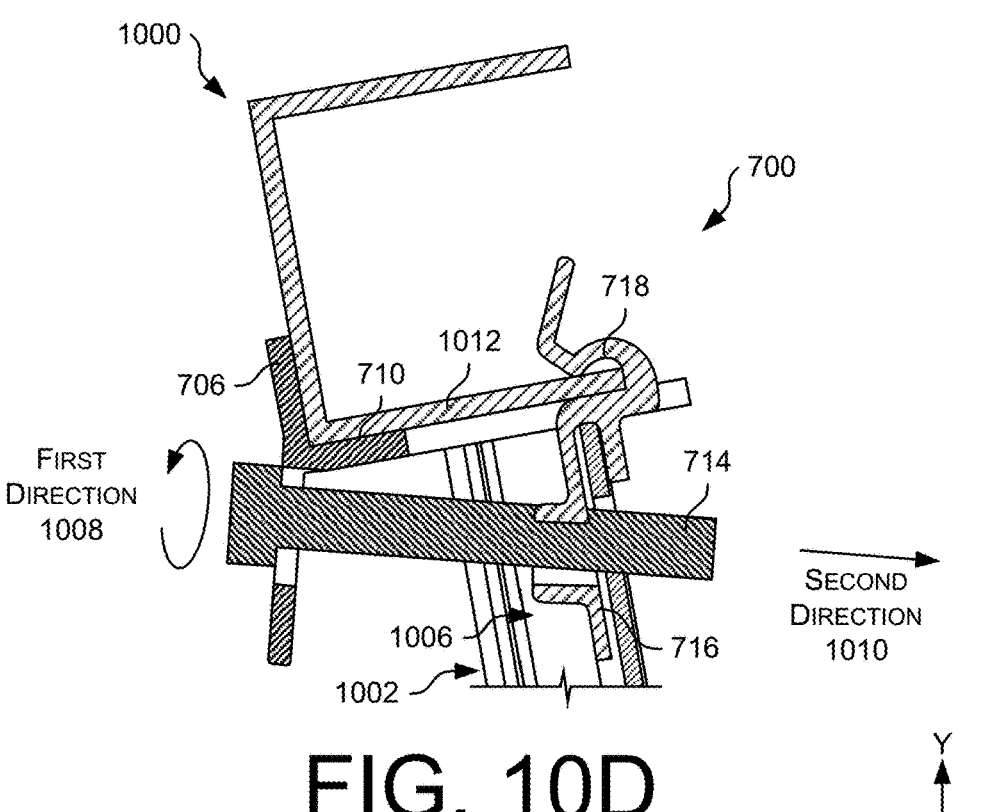

Actuation of the clamping mechanism 700 is described with regard to FIG. 10D, which illustrates a cross-sectional view of the clamping mechanism 700, the solar module frame 1000, and the mounting rail 1002, taken along line C-C of FIG. 10C. To couple the solar module frame 1000 to the mounting rail 1002, the fastener 714 may be tightened in a first direction 1008 (e.g., clockwise about the X-axis). As the fastener 714 is threaded into the socket 720, the fastener 714 translates in a second direction 1010 (e.g., along the X-axis). Given the engagement between the fastener 714 and the second flange 708, as the fastener 714 translates in the second direction 1010, the first body 702 additionally moves in the second direction 1010. In doing so, the solar module frame 1000 may become clamped between the first flange 706 and the module engagement component 718. More particularly, a flange 1012 of the solar module frame 1000 may become clamped between the first flange 706 and the rear surface 914 of the channel 912. The flange 1012 rests on the first surface 722 of the third flange 710.

During an uncoupling of the solar module frame 1000 from the mounting rail 1002, the fastener 714 may be rotated in a third direction (e.g., counterclockwise about the X-axis, opposite the first direction 1008). As the fastener 714 is unthreaded from the socket 720, the fastener 714 translates in a fourth direction (e.g., along the X-axis, opposite the second direction 1010). As the fastener 714 moves in the fourth direction, the first body 702 may be moved (e.g., inherently or with application of a force) in the fourth direction. Movement of the second body 704 in the fourth direction results in the solar module frame 1000 no longer being clamped between the first flange 706 and the module engagement component 718, thereby permitting the solar module frame 1000 to be removed from the mounting rail 1002.

Figure 11A:
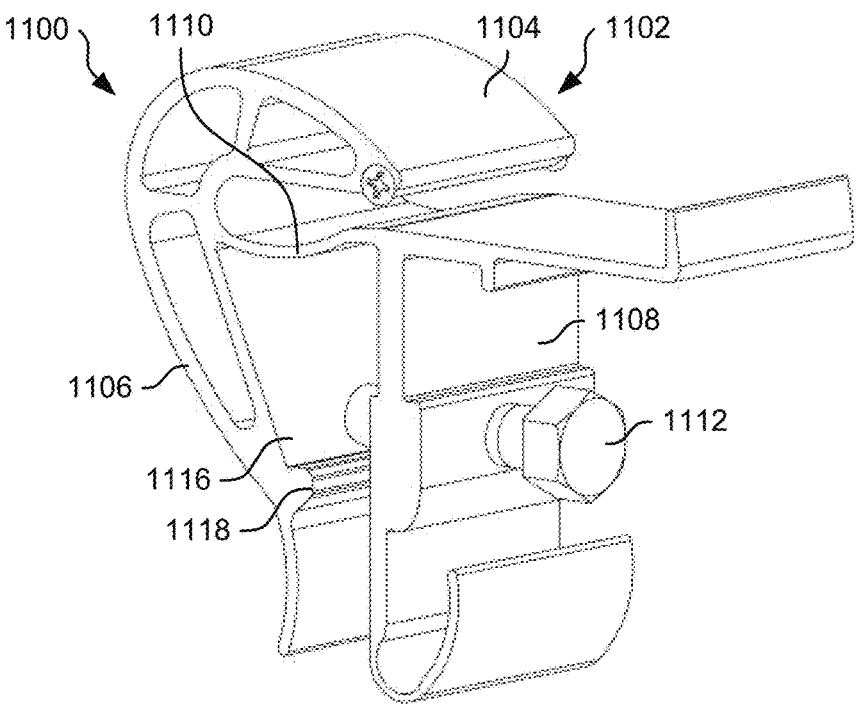
FIGS. 11A and 11B illustrate an example clamping mechanism configured to secure a solar module to a mounting rail, according to an embodiment of the present disclosure.
Figure 11A:
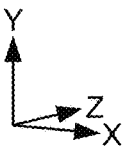
Figure 11B:
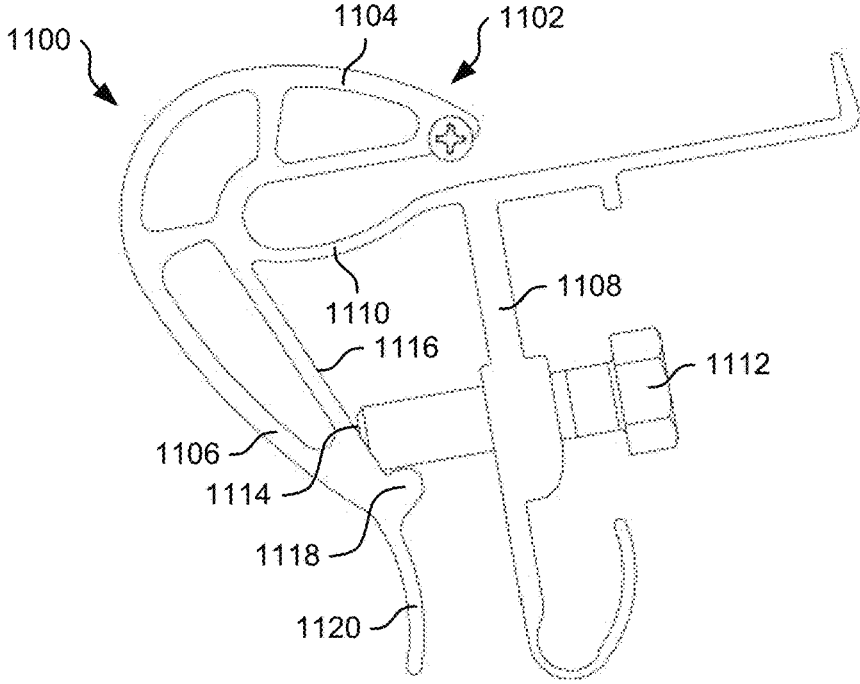
Figure 11B:
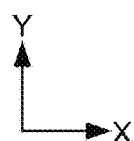

FIGS. 11A and 11B illustrate an example clamping mechanism 1100, according to an embodiment of the present disclosure. The clamping mechanism 1100 may include a body 1102 that defines a module engagement component 1104, a clamp actuation component 1106, and a rail engagement component 1108. In an embodiment, the clamping mechanism 1100 may be similar to the clamping mechanism 300, however, as shown, the rail engagement component 1108 may be coupled to the clamp actuation component 1106 via an arm 1110. Here, the arm 1110 may be implemented in lieu of the first arm 312 rotatably coupling to the second arm 318 (via the first socket 316 and the shaft 342). In other words, the clamping mechanism 1100 may include a single body (e.g., the body 1102) as compared to the multiple bodies of the clamping mechanism 300 (e.g., the first body 302 and the second body 304).

The clamping mechanism 1100 includes a fastener 1112 that is received within a socket of the rail engagement component 1108. When tightened, and as similarly discussed above with regard to the clamping mechanism 300, an end 1114 of the fastener 1112 may engage an interior surface 1116 of the body 1102 at the clamp actuation component 1106. In an embodiment, the interior surface 1116 may include a lip 1118 against which the end 1114 of the fastener 1112 abuts or rests on the lip 1118. The engagement between the end 1114 of the fastener 1112 and the lip 1118 may prevent a disengagement with the clamp actuation component 1106. During this engagement, and through further actuation of the fastener 1112, the body 1102 may rotate about the arm 1110 (e.g., about the Z-axis) and the module engagement component 1104 may contact the solar module frame.

In an embodiment, the arm 1110 may include a compliant flexible web such that the module engagement component 1104 is able to apply a force on the solar module frame as the clamp actuation component 1106 is actuated. Moreover, the compliant flexible web of the arm 1110 permits the arm 1110 to flex, bend, or at least partially rotate such that the module engagement component 1104 is able to clamp the solar module frame.

In an embodiment, the body 1102 further defines a tail component 1120 that extends from an end of the clamp actuation component 1106. In an embodiment, the tail component 1120 may include a slightly a tapered or curved outer surface that extends along a trajectory of the clamp actuation component 1106. In an embodiment, the tail component 1120 may permit a user (e.g., foreman, crafts-man, installer, etc.) to grasp the body 1102 and manipulate the body 1102. For example, grasping the tail component 1120, the user temporarily rotate the body 1102, and bring the module engagement component 1104 into contact with the solar module frame. Therein, the user may actuate the fastener 1112 to secure the body 1102 in place (e.g., via the end 1114 of the fastener 1112 engaging with the clamp actuation component 1106).

Figure 12:
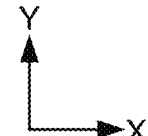
FIG. 12 illustrates an example use of the clamping mechanism of FIGS. 11A and 11B, according to an embodiment of the present disclosure.

FIG. 12 illustrates an example coupling of a solar module frame 1200 to a mounting rail 1202 using the clamping mechanism 1100, according to an embodiment of the present disclosure. The actuation of the clamping mechanism 1100 may be similar to the clamping mechanism 300. For example, in an embodiment, the mounting rail 1202 may be similar to the mounting rail 602. As the fastener 1112 is rotated, the end 1114 of the fastener 1112 coming into contact with the clamp actuation component 1106 and causes the module engagement component 1104 to rotate into engagement with a flange of the solar module frame 1200. The arm 1110 of the body 1102, for example, permits the module engagement component 1104 to rotate into engagement with the solar module frame 1200.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A clamping mechanism to secure a solar module frame to a mounting rail, the clamping mechanism comprising:
   a body including:
      a module engagement component to engage the solar module frame,
      a clamp actuation component having an interior surface, and
      a rail engagement component having:
         an end to engage the mounting rail, and
         a socket including threads; and

a fastener including threads that engage with the threads of the socket, the fastener having a head on a first end and a surface on a second end opposite the head, the surface positioned to face and to abut the interior surface of the clamp actuation component,
wherein during actuation of the fastener the module engagement component rotates to engage the solar module frame and the rail engagement component translates to engage the mounting rail.

2. The clamping mechanism of claim 1, wherein:
the mounting rail includes a channel having a first flange and a second flange;
the end of the rail engagement component is engageable with the first flange and the second flange;
the clamp actuation component is at least partially disposed within the channel; and
the rail engagement component is at least partially disposed within the channel.

3. The clamping mechanism of claim 1, wherein:
actuation of the fastener in a first direction threads the fastener into the socket; and
actuation of the fastener in the first direction translates:
   the second end of the fastener in a second direction to engage the surface of the clamp actuation component and rotate the module engagement component in a third direction to engage the solar module frame, and
   the first end of the rail engagement component in a fourth direction to engage the mounting rail.

4. The clamping mechanism of claim 3, wherein a portion of the rail engagement component is flexible during translation of the fastener in the second direction.

5. The clamping mechanism of claim 1, wherein the end of the rail engagement component includes one or more ribs for engaging with the mounting rail.

6. The clamping mechanism of claim 1, wherein the module engagement component includes one or more fasteners for engaging with the solar module frame.

7. A clamping mechanism comprising:
   a rail engagement component at least partially disposed within a channel of a rail, the rail engagement component including a socket;
   a module engagement component to engage with a solar module frame of a solar module to couple the solar module to the rail;
   a clamp actuation component to cause movement of the module engagement component to couple the solar module to the rail; and
   a fastener threadingly engaged with the socket, wherein during rotation of the fastener, an end of the fastener engages with a surface of the clamp actuation component to cause movement of the module engagement component to secure the solar module to the rail, the end being disposed external to the clamp actuation component.

8. The clamping mechanism of claim 7, wherein:
the rail engagement component extends from the clamp actuation component; and
an end of the rail engagement component that engages with the rail includes a rib.

9. The clamping mechanism of claim 7, wherein:
the clamping mechanism includes a body that defines the clamp actuation component and the module engagement component; and
the body includes:
   a first groove disposed on a first side of the body, the first groove being engageable with a first flange of the rail, and

a second groove disposed on a second side of the body that is opposite the first side, the second groove being engageable with a second flange of the rail.

10. The clamping mechanism of claim 7, wherein:

during rotation of the fastener, the fastener is movable in a first direction; and movement of the fastener in the first direction is configured to:

rotate the module engagement component in a second direction to engage the solar module frame, and move the rail engagement component in a third direction to engage the rail.

11. The clamping mechanism of claim 7, wherein:

a first end of the module engagement component electrically bonds with the solar module frame; and a second end of the rail engagement component electrically bonds with the rail.

12. The clamping mechanism of claim 7, wherein:

a first body of the clamp actuation component includes the clamp actuation component and the module engagement component; and a second body of the clamp actuation component includes the rail engagement component.

13. The clamping mechanism of claim 12, wherein the first body and the second body hingedly couple together.

14. A clamping mechanism comprising:

a body defining:

a first end, a second end, a module engagement component disposed proximate to the first end, the module engagement component being engageable with a portion of a solar module frame, and a clamp actuation component disposed proximate to the second end;

a rail engagement component integral with the body at a location between the first end and the second end, wherein a portion of the rail engagement component engages a rail to which the solar module frame is configured to couple; and a fastener to engage the clamp actuation component for imparting movement to the module engagement component such that the module engagement component engages the portion of the solar module frame, the fastener having an end with a surface to engage a surface of the clamp actuation component at a position between the location and the second end.

15. The clamping mechanism of claim 14, wherein the rail engagement component includes a socket in which the fastener is threadingly engaged.

16. The clamping mechanism of claim 14, wherein:

the clamping mechanism includes a second body that defines the rail engagement component; and the body and the second body are hingedly coupled.

17. The clamping mechanism of claim 14, wherein:

the first end electrically bonds with the solar module frame; and the rail engagement component includes a third end electrically bonds with the rail.

18. The clamping mechanism of claim 7, wherein during rotation of the fastener, the rail engagement component moves into engagement with the rail.

19. The clamping mechanism of claim 14, wherein:

rotation of the fastener in a first direction causes the fastener to translate in a second direction; and translation of the fastener in the second direction:

causes movement to the module engagement component in a third direction such that the module engagement component engages the portion of the solar module frame, and causes movement to the rail engagement component in a fourth direction such that the rail engagement component engages the rail.

20. The clamping mechanism of claim 14, wherein the end of the fastener is substantially transverse to a longitudinal axis of the fastener.

* * * * *